United States Patent [19]

DeGood et al.

[11] 4,196,312
[45] Apr. 1, 1980

[54] ACCUMULATION LIVE ROLLER CONVEYOR

[75] Inventors: David A. DeGood, Hudsonville; David K. Stevens, Jenison, both of Mich.

[73] Assignee: David A. DeGood, Hudsonville, Mich.

[21] Appl. No.: 892,835

[22] Filed: Apr. 3, 1978

Related U.S. Application Data

[63] Continuation-in-part of Ser. No. 768,980, Feb. 16, 1977.

[51] Int. Cl.[2] .............................................. B65G 13/06
[52] U.S. Cl. ...................................... 198/781; 198/790
[58] Field of Search .............. 198/790, 789, 781, 780, 198/783, 788, 787; 74/221

[56] References Cited

U.S. PATENT DOCUMENTS

| | | | |
|---|---|---|---|
| 3,643,788 | 2/1972 | Werntz | 198/781 |
| 3,760,932 | 9/1973 | Schneider | 198/781 |
| 3,840,110 | 10/1974 | Molt et al. | 198/781 |
| 4,091,916 | 5/1978 | Warner | 198/790 |

Primary Examiner—Robert B. Reeves
Assistant Examiner—Douglas D. Watts
Attorney, Agent, or Firm—Ian C. McLeod

[57] ABSTRACT

An improved drive unit for accumulation live roller conveyors utilizing frictional engagement of a radial surface provided on drive wheels against the rollers is described. The drive unit includes multiple drive wheels each functioning to rotate two rollers simultaneously and each provided with a radial frictional drive surface which engages the rollers. The drive wheels are rotatably mounted in spaced and aligned relation on a support bar and the support bar is arcuately pivotable on a frame supporting the rollers towards the roller surfaces in order to selectively bring the radial drive wheel surfaces into contact with the roller surfaces.

16 Claims, 5 Drawing Figures

ACCUMULATION LIVE ROLLER CONVEYOR

CROSS-REFERENCE TO RELATED APPLICATION

This patent application is a continuation-in-part of our U.S. application Ser. No. 768,980, filed Feb. 16, 1977.

DESCRIPTION OF THE INVENTION

The present invention relates to an improved drive unit for accumulation live roller conveyors. In particular the present invention relates to a drive unit which functions to selectively drive multiple rollers simultaneously.

PRIOR ART

Live roller accumulation conveyors are well known to the prior art. The present invention is concerned with conveyors which are constructed with frictional drive units such that the power source can be disconnected from the rollers as articles accumulate on the pass line so that the articles do not press against each other or what is termed in the art as "zero pressure" accumulation. One mechanism which disconnects the rollers is a trigger or sensor on the pass line which when depressed by an article moves a mechanical linkage which disconnects the power source from the rollers. Usually the linkage is a mechanical rod or arm which is moved by the passage of the article over the pass line trigger; however, sometimes air pressure bellows or solenoids or other motive means are activated by the trigger to move the linkage.

U.S. Pat. Nos. 3,012,652 (Poel); 3,612,248 (Wallis); 3,643,788 (Werntz); 3,730,330 (M. J. DeGood) and 3,810,538 (Moyes) disclose such prior art devices. Each of these patents show a conveyor wherein one or more of the rollers is moved by selectively frictionally contacting the rollers with a rotating frictional drive belt provided under the pass line ('248, '652, '788 and '300) or by selectively contacting the frictional drive belt with a rotating power means ('538). These devices operate reliably but are relatively complicated and expensive to construct. Also they have pinch points which may not be covered and which can cause safety problems.

OBJECTS

It is therefore an object of the present invention to provide an improved live roller accumulation conveyor which is simple and inexpensive to construct and which has a single drive unit for the frictional drive of multiple rollers. It is particularly an object of the present invention to provide a means for powering the multiple rollers by means of multiple frictional drive surfaces provided on rotatable drive wheels which are pivotably and arcuately movable into and out of contact with multiple rollers and which also very rapidly responds to the application of the power. Further still, it is an object of the present invention to provide an improved conveyor which has the possible pinch points well shielded by the frame. These and other objects will become apparent by reference to the following description and the drawings.

IN THE DRAWINGS

FIG. 3 is a front view of the support bar for the multiple drive wheels shown in FIGS. 1 and 2 particularly illustrating legs on a cross member comprising the support bar and slots forming the pivot points on the legs for mounting on the frame.

FIG. 4 is a top view of the support bar shown in FIG. 3 particularly illustrating the positioning of a plate for the connecting rod for movement of the support bar.

FIG. 5 is an end view of the support bar shown in FIGS. 3 and 4 particularly illustrating dual stops for preventing over-run of the support bar in either direction of arcuate movement by contact with the frame.

DESCRIPTION OF THE INVENTION

The present invention relates to the improvement in a live roller conveyor apparatus including a frame and a plurality of rollers mounted on longitudinal axes at both ends on the frame in spaced relation so as to define a pass line on surfaces of the rollers for transport of articles by the rollers which comrpises: a support bar positioned on the frame adjacent the axes of multiple rollers, the support bar being arcuately pivotable towards and away from the axes of the rollers; multiple drive wheels each provided with a radial frictional drive surface and rotatably mounted in spaced aligned relation on the support bar such that the frictional drive surfaces on each drive wheel each come into contact with two roller surfaces upon arcuately pivoting the support bar towards the axes of the rollers; means for powering the drive wheels, and means for pivoting the support bar so that the frictional drive surfaces move into and out of contact with the surfaces of the rollers.

The present invention particularly relates to an improved live roller conveyor apparatus which comprises: a frame; a plurality of rollers mounted on longitudinal axes at both ends on the frame in spaced relation so as to define a pass line on surfaces of the rollers for transport of articles by the rollers; a support bar positioned on the frame adjacent the axes of multiple rollers, the support bar being arcuately pivotable towards and away from the axes of the rollers; multiple drive wheels each with a circumferential double rimmed groove rotatably mounted in spaced aligned relation on the support bar such that each drive wheel is adjacent the surfaces of and between two rollers; an endless resilient belt which fits into the groove of each drive wheel such that a surface of each of the belts is movable into contact with the surfaces of two rollers when the support bar is arcuately pivoted towards the axes of the rollers without slipping out of the groove; a rotatable drive shaft provided with power means for rotation mounted along the pass line and in tensioned engagement with the resilient belts; and an assembly for moving the surfaces of the resilient belts on the drive wheels into and out of contact with the surfaces of the rollers by arcuately pivoting the support bar including a trigger mounted on the pass line which activates a linkage on the frame which pivots the support bar.

In our U.S. application Ser. No. 768,980, we described a drive unit wherein an arm supporting a single drive wheel was arcuately pivotable into contact with a tapered end surface of a roller. There was a need to improve upon this drive unit since each drive wheel required a separate powered linkage for powered movement of the arm which resulted in the present invention.

SPECIFIC DESCRIPTION

Figure 1:
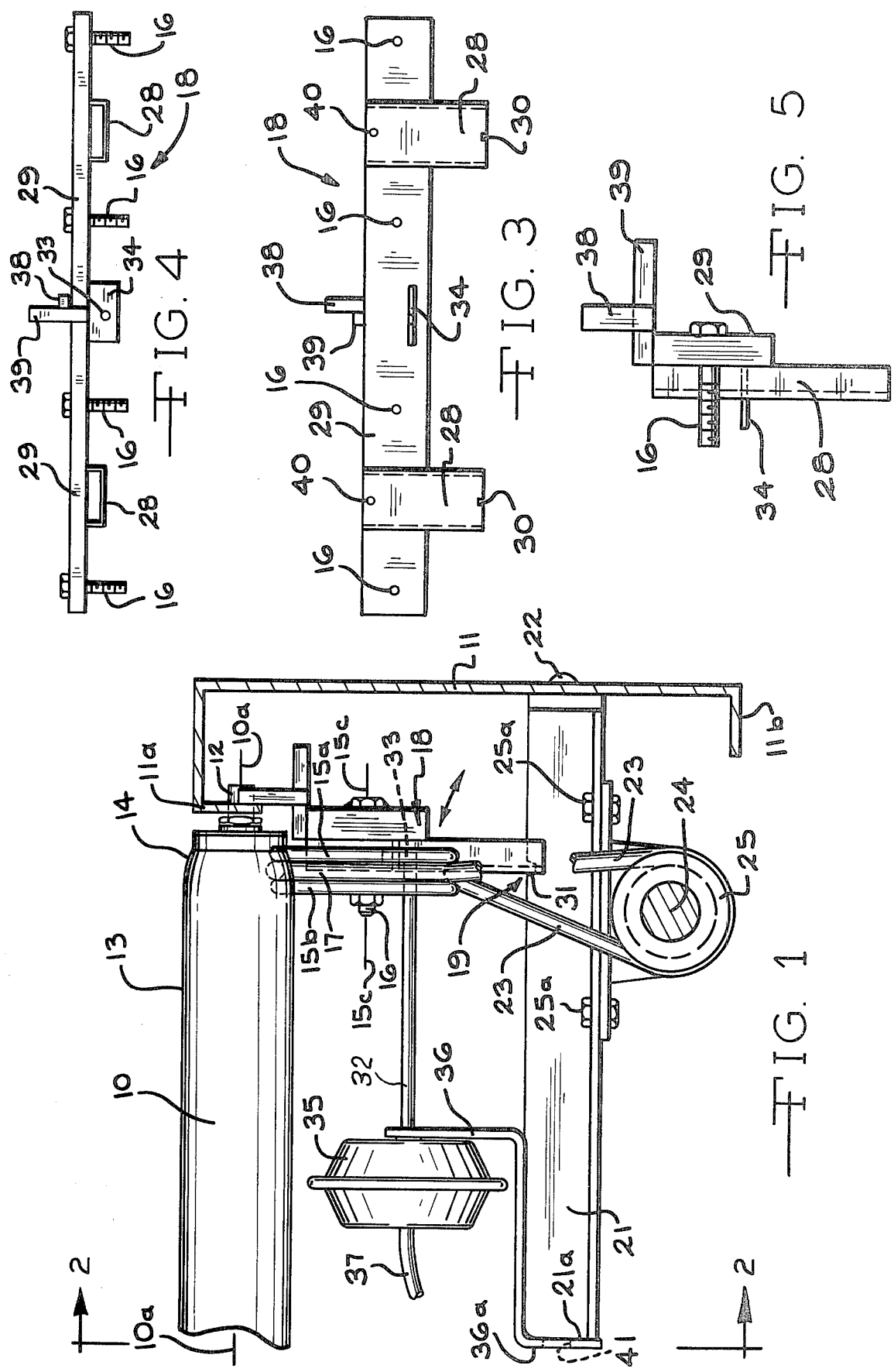
FIG. 1 is a front view of a partial cross-section across the frame rail of a half section of the preferred improved conveyor in a powered roller position illustrating a driven belt as a frictional drive surface which also rotates one drive wheel mounted on a support bar which arcuately pivots the belt so as to frictionally engage a tapered end surface of a roller.
Figure 2:
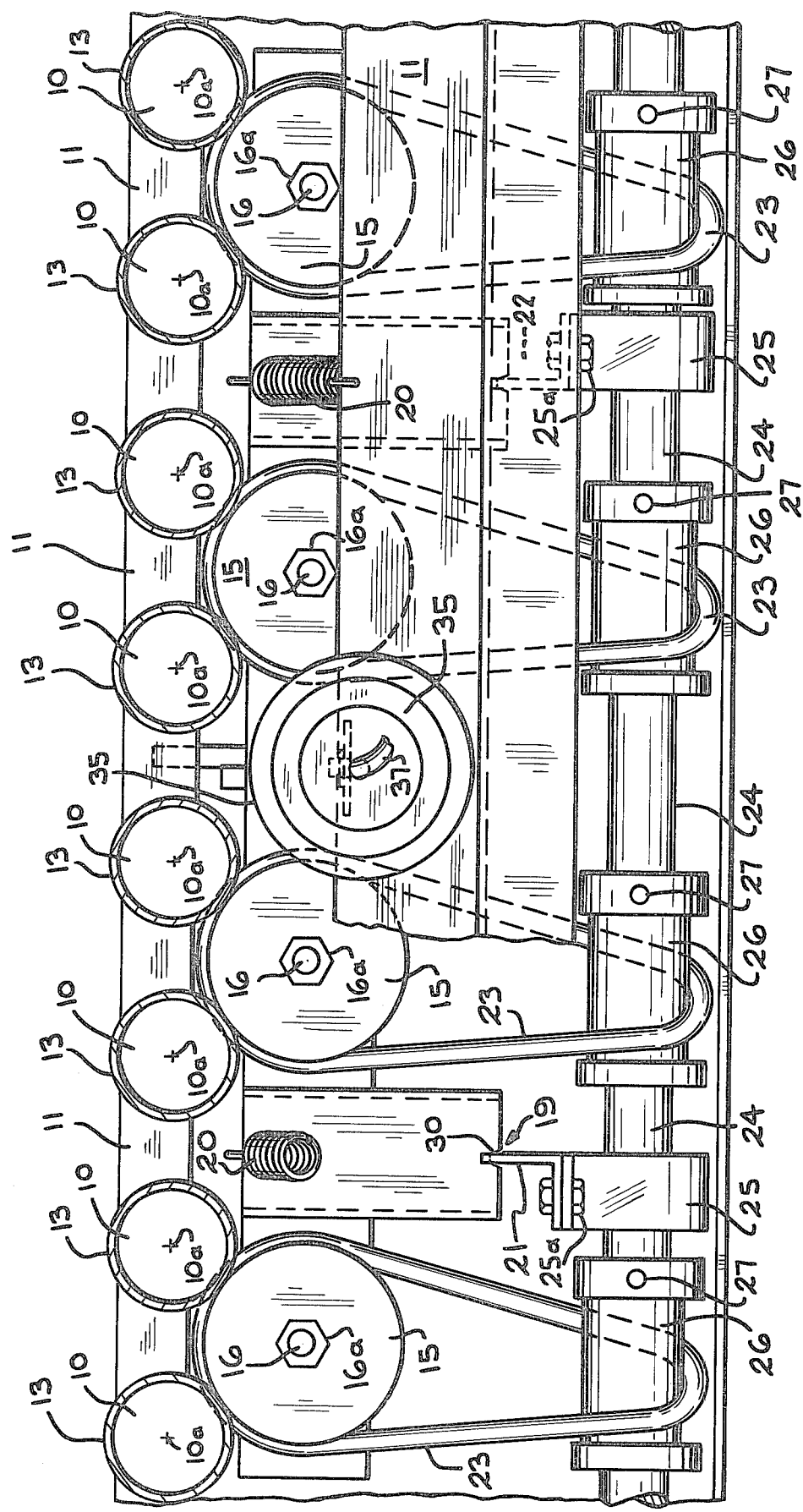
FIG. 2 is an end view along line 2—2 of FIG. 1 of a cross-section through eight spaced apart adjacent rollers illustrating resilient belts mounted on four drive wheels rotatably mounted on the pivotable support bar, each belt being positioned for engagement with a portion of the tapered end surfaces of two rollers.

In FIGS. 1 and 2, live rollers 10, each having a longitudinal axis 10a, are shown which form a part of a pass line on a conveyor. The rollers 10 are mounted rotatably on their longitudinal axes 10a in a channeled frame rail 11 by means of hexagonal shafts 12 which are attached to the frame rail 11 and to the rollers 10 by means of conventional internal roller bearings (not shown). The frame rail 11 includes an upper inner lip 11a for mounting the shafts 12 and a lower lip 11b facing inwardly towards the rollers 10 which shield a drive unit. The rollers 10 together define an article carrying surface 13. A tapered surface 14 is provided at one end of the roller(s) 10 to be powered. As can be seen from FIG. 2, eight spaced apart, adjacent rollers 10 have tapered surfaces 14 and are powered by a single drive unit.

Attached to the frame and between and below the adjacent rollers 10 is provided the drive unit including multiple drive wheels 15 each defining a circumferential groove 17. The drive wheels 15 are each rotatably mounted on their radial axes on a round cross-sectioned fixed or welded bolts 16 by nuts 16a. Conventional roller bearings (not shown) are provided in the drive wheels 15. The drive wheels 15 on bolts 16 are mounted on a support bar 18 which is pivotable at point 19 to move the drive wheels 15 tangentially into a closely spaced relationship with the tapered surfaces 14 on the rollers 10.

In the preferred form, coil springs 20 or other resilient means attached between the support bar 18 and the frame are provided which urge the support bar 18 and drive wheels 15 towards the tapered surfaces 14. Cross members or bars 21 are attached between frame rails 11 (only one of which is shown in FIG. 1) in spaced parallel relationship to the rollers 10 by means of rivets 22 in order to join spaced apart frame rails 11 and the rails 11 and bar 21 form the frame.

Resilient high friction belts 23 (preferably circular in cross-section) are mounted in the groove 17 of each drive wheel 15 such that a small circular segment or surface of the belt 23 frictionally engages the tapered surfaces 14 when the drive wheels 15 are in their most extended position due to the urging of the springs 20. The outer rim 15a of the drive wheels 15 must be large enough in diameter so that the belt 23 does not slip out of the groove 17 because of the lateral force along the axes 10a of the rollers 10 exerted by taper 14 of the roller 10 on the belt 23. The inner rim 15b is designed to be in closely spaced relation to the surface 13 beneath the roller 10.

Spaced apart from the drive wheels 15 and support bar 18 is rotatable drive shaft 24 which is mounted along the pass line formed by the rollers 10. The shaft 24 rotates in journals 25 mounted by means of bolts and nuts 25a on the underside of the cross members 21 (FIG. 2). Spools or bushings 26 are mounted on the drive shaft 24 and are fixed in position on the shaft 24 beneath each drive wheel 15 by allen screws 27 (FIG. 2) or the like. The belts 23 are in tension on the bushings 26 so that they are in turn in tension on the drive wheels 15 in the grooves 17 so as not to slip. The drive shaft 24 is powered by a motor or other motive means usually at one end (not shown).

As indicated, the support bar 18 is mounted on cross bar 21 at pivot point 19 such that the support bar 18 can rock or pivot towards and away from the tapered surface 14. The support bar 18 is shown in detail in FIGS. 3 to 5. The support bar 18 includes two legs 28 mounted on cross piece 29 which supports the bolts 16 for mounting the drive wheels 15. Slots 30 are provided at the distal end of each of the legs 28 which mate with slots 31 in the cross member 21 to form the pivot point 19. The support bar 18 is moved by a linkage or arm 32 (FIG. 1) loosely attached to the support bar 18 by a bend 33 in the arm 32 positioned in a hole 33 in a plate 34 attached to the center of the cross piece 29. The linkage 32 is moved by an air bellows 35 mounted on the cross piece 21 by a bracket 36 and powered by an air line 37 attached to the bellows 35. The bellows 35 has an internal diaphragm (not shown) which is moved by applying air pressure in line 37 to move the linkage 32 and thus the support bar 18 away from the axes 10a of the rollers 10. The bellows 35 can also be operated on the other side of the diaphragm by means of a vacuum (not shown). Stops 38 and 39 are provided on the back side of the cross piece 29. The stop 38 contacts the frame rail 11 when the arm 32 is extended to prevent dislocation of the legs 39 from the pivot points 19. The stop 39 contacts the inside of the inner lip 11a on the frame rail 11 to prevent the springs 20 from pulling the belt 23 into too tight contact with the taper 14. All that is required is a firm contact between the taper 14 and belt 23. The springs 20 are attached through holes 40 in legs 38.

As shown in FIG. 1, the cross member 21 is adapted to be mated to rollers 10 of varying length by means of short cross members 21. The end 21a of the cross member 21 has an extension 36a of bracket 36 welded to it and holes 41 are provided on either side of the extension 36a to receive bolts for attachment of extensions to the other side rail (not shown). Alternatively the cross member 21 can be a single piece between frame rails 11 on either side of rollers 10.

In operation, the springs 20 urge the rotating belts 23 into contact with the tapered surfaces 14 to power the rollers 10 and also hold the slots 30 and 31 together at the pivot point 19. When an article (not shown) moves on the pass line downstream from the rollers 10, a trigger bar (not shown) is depressed which opens a valve and supplies air pressure to the bellows 35. The linkage 32 moves the support bar 18 outward toward the frame rail 11 and disconnects the belts 23 from frictional engagement with the tapered surfaces 14. If the article merely rapidly passes over the trigger bar, the belts 23 rapidly re-engage the tapered surfaces 14; however, if the article is halted on the pass line, then the belts 23 remain disengaged from the tapered end surfaces 14.

As shown in FIG. 1, the belts 23 engage a tapered end surface 14 of the rollers 10 which is preferred. It will be appreciated that the drive wheels 15 can engage any of the surfaces 13 of the rollers 10, such as where the longitudinal axes 15c of the drive wheels 15 are tilted at an acute angle to the longitudinal axes of the rollers 10, rather than being almost parallel as shown in FIG. 1. In this event the rims 15a and 15b of drive wheels 15 need to be shaped and of a diameter so that the belts 23 readily engage the surfaces 13 of the rollers 10.

It will be appreciated that various means for driving the drive wheels 15 can be used, such as motors and the like, and preferably the drive wheels 15 operate synchronously and in the same direction of rotation. In this event, the drive wheels 15 have a radial circumferential frictional drive surface which engages the surfaces 13 preferably the end surface 14 of the rollers 10. Such modifications are described in detail in our U.S. application Ser. No. 768,980.

We claim:

1. A live roller conveyor apparatus which comrpises:
   (a) a frame;
   (b) a plurality of rollers mounted on longitudinal axes at both ends on the frame in spaced relation so as to define a pass line on surfaces of the rollers for transport of articles by the rollers;
   (c) a support bar positioned on the frame adjacent the axes of multiple rollers, the support bar being arcuately pivotable towards and away from the axes of the rollers;
   (d) multiple drive wheels each with a circumferential double rimmed groove rotatably mounted in spaced aligned relation on the support bar such that each drive wheel is adjacent the surfaces of and between two rollers;
   (e) an endless resilient belt which fits into the groove of each drive wheel such that a surface of each of the belts is movable into contact with the surfaces of two rollers when the support bar is arcuately pivoted towards the axes of the rollers without slipping out of the groove;
   (f) a rotatable drive shaft provided with power means for rotation mounted along the pass line and in tensioned engagement with the resilient belts; and
   (g) an assembly for moving the surfaces of the resilient belts on the drive wheels into and out of contact with the surfaces of the rollers by arcuately pivoting the support bar including a trigger mounted on the pass line which activates a linkage on the frame which pivots the support bar.

2. The apparatus of claim 1 wherein the support bar includes legs which are held against the frame so that the support bar is arcuately pivotable.

3. The apparatus of claim 1 wherein the linkage includes an air or vacuum actuated bellows mounted on the frame and connected to the support bar by a rod which moves the support bar when the bellows is actuated.

4. The apparatus of claim 1 wherein the resilient belts are circular in cross-section.

5. The apparatus of claim 1 wherein bushings for mounting the resilient belts are provided on the drive shaft.

6. The apparatus of claim 1 wherein resilient means provided between the frame and the pivotable support bar urges the drive wheels and thus the resilient belt surfaces into contact with the surfaces of the rollers.

7. The apparatus of claim 1 wherein the resilient belts each contact tapered end surfaces of the rollers.

8. In a live roller conveyor apparatus including a frame and a plurality of rollers mounted on longitudinal axes at both ends on the frame in spaced relation so as to define a pass line on surfaces of the rollers for transport of articles by the rollers the improvement which comprises:
   (a) a support bar positioned along the pass line on the frame adjacent the axes of multiple rollers, the support bar being arcuately pivotable about an axis parallel to the pass line towards and away from the axes of the rollers;
   (b) multiple drive wheels each provided with a radial frictional drive surface and rotatably mounted on shafts in spaced aligned relation on the support bar such that the frictional drive surfaces on each drive wheel each come into contact all at the same time with two roller surfaces upon arcuately pivoting the support bar and the drive wheels towards the axes of the rollers;
   (c) means for powering the drive wheels; and
   (d) means including a trigger mounted on the pass line which activates a powered means for driving a linkage mounted on the frame and connected to the support bar wherein linkage pivots the support bar so that the frictional drive surfaces move into and out of contact with the surfaces of the rollers.

9. The apparatus of claim 8 wherein the trigger on the pass line activates the powered linkage includes an air or vacuum operated bellows mounted on the frame and connected to the support bar by a rod which pivots the support bar when the bellows is actuated.

10. The apparatus of claim 8 wherein a resilient means is provided between the frame and the pivotable support bar which urges the drive wheels and thus the radial drive surface into contact with the surfaces of the roller.

11. The apparatus of claim 8 where there are four drive wheels on the support bar driving eight rollers.

12. The drive unit for a live roller accumulation conveyor with a plurality of rollers mounted on longitudinal axes at both ends on a frame in spaced relation so as to define a pass line on surfaces of the rollers for transport of articles by the rollers which comprises:
   (a) a support bar positionable on the frame of the conveyor along the pass line adjacent the axes of multiple rollers, the support bar being adapted to be arcuately pivotable about an axis parallel to the pass line towards and away from the axes of the rollers;
   (b) multiple drive wheels adapted to be powered each having or adapted to receive a frictional drive surface and rotatably mounted on shafts in spaced aligned relation on the support bar so that frictional drive surfaces on each drive wheel can come into contact all at the same time with two roller surfaces upon arcuately pivoting the support bar and the drive wheels towards the axes of the rollers;
   (c) attachment means on the support bar adapted for pivoting the support bar when mounted on the frame; and
   (d) a powered means for driving a linkage connected to the attachment means adapted to be mounted on the frame and activatable by a trigger to be mounted on the pass line of the conveyor.

13. The drive unit of claim 12 wherein each of the drive wheels have a circumferential groove and are adapted to receive a resilient belt as the radial frictional drive surface.

14. The drive unit of claim 13 wherein the groove is semi-circular in cross-section and adapted to receive a circular cross-sectioned resilient belt.

15. The drive unit of claim 12 wherein the support bar includes a cross piece supporting bolts and nuts for mounting the drive wheels and wherein legs project from the cross piece for pivotal connection to the frame.

16. The drive unit of claim 15 wherein stops are mounted on the cross piece opposite the drive wheels for preventing the support bar from moving too far away from or too close to the rollers.

* * * * *